United States Patent [19]

Niikuni et al.

[11] Patent Number: 5,554,707

[45] Date of Patent: Sep. 10, 1996

[54] GRANULAR VINYL CHLORIDE RESIN AND PROCESS FOR ITS PREPARATION

[75] Inventors: Tokio Niikuni; Yukio Noro, both of Yokkaichi, Japan

[73] Assignee: Mitsubishi Chemical MKV Company, Tokyo, Japan

[21] Appl. No.: 221,456

[22] Filed: Apr. 1, 1994

Related U.S. Application Data

[63] Continuation of Ser. No. 5,399, Jan. 15, 1993, abandoned.

[30] Foreign Application Priority Data

| Jan. 17, 1992 | [JP] | Japan | 4-006840 |
| Jan. 17, 1992 | [JP] | Japan | 4-006841 |
| Jan. 17, 1992 | [JP] | Japan | 4-006842 |

[51] Int. Cl.$^6$ ............................................ C08F 114/06
[52] U.S. Cl. .................. 526/344.2; 526/345; 528/502 E
[58] Field of Search ............................ 526/329.4, 330, 526/344.2, 345

[56] References Cited

U.S. PATENT DOCUMENTS

| 3,642,745 | 2/1972 | Golstein | 526/344.2 |
| 3,671,508 | 6/1972 | Koyanagi | 526/344.2 |
| 3,678,021 | 7/1972 | Chatelain | 526/344.2 |
| 3,682,877 | 8/1972 | Czekay | 526/344.2 |
| 3,706,705 | 12/1972 | Koyanagi | 526/344.2 |
| 3,706,722 | 12/1972 | Nelson | 526/344.2 |
| 3,716,507 | 2/1973 | Glomski | 526/344.2 |
| 4,002,702 | 1/1977 | Kuhn . | |

FOREIGN PATENT DOCUMENTS

| 0369387 | 5/1990 | European Pat. Off. . |
| 1957391 | 7/1970 | Germany . |
| 2257182 | 5/1973 | Germany . |
| 130259 | 3/1978 | Germany . |
| 138666 | 11/1979 | Germany . |
| 3150154 | 6/1983 | Germany . |
| 4823180 | 7/1973 | Japan . |
| 2133410 | 5/1990 | Japan . |
| 2133409 | 5/1990 | Japan . |

OTHER PUBLICATIONS

WO88/05451 Jul. 28, 1988.

*Primary Examiner*—Christopher Henderson
*Attorney, Agent, or Firm*—Oblon, Spivak, McClelland, Maier, & Neustadt, P.C.

[57] ABSTRACT

A granular vinyl chloride resin having a mixture comprising the following vinyl chloride resin particles (A), (B) and (C) as main components granulated to have a spherical shape with a diameter of from 50 to 300 μm or a cylindrical shape with a diameter of from 0.1 to 20 mm:

(A) from 90 to 10% by weight of fine particles with diameters within a range of not larger than 3 μm (hereinafter referred to as fine particles (A)), (B) from 10 to 90% by weight of particles with diameters within a range of from 5 to 65 μm (hereinafter referred to as particles (B)), and (C) from 0 to 10% by weight of particles with diameters other than those of particles (A) and (B).

5 Claims, No Drawings

GRANULAR VINYL CHLORIDE RESIN AND PROCESS FOR ITS PREPARATION

This application is a Continuation of application Ser. No. 08/005,399, filed on Jan. 15, 1993, now abandoned.

BACKGROUND OF THE INVENTION

1. Field of the Invention

The present invention relates to a granular vinyl chloride resin which is low-dusting and excellent in the powder flowability and which can be used as a paste-making resin, and a process for producing it.

2. Description of the Related Art

For the purpose of automatic weighing or preventing dusting of a paste vinyl chloride resin, it has been attempted in recent years to granulate a fine powder of a paste vinyl chloride resin itself. For example, Japanese Unexamined Patent Publications No. 133409/1990 and No. 133410/1990 disclose a process wherein an aqueous dispersion of a paste-making vinyl chloride resin is dried by means of a spray dryer having a rotary disk atomizer, and the rotational speed of the rotary disk and the temperature and humidity of the drying air during the drying operation, are adjusted to produce a granular resin. However, in this process, if the rotational speed of the rotary disk is reduced to increase the particle size of the granules, drying at a high temperature will be required, and the resulting granular resin tends to be hard and can not readily be dispersed in a plasticizer, whereby a plastisol can hardly be formed.

On the other hand, if the drying temperature is lowered, drying will be inadequate, and a separate drying step will be required again, or a spray drying apparatus of a large size will have to be installed. Thus, an economical disadvantage can not be avoided. In a case where a paste-making vinyl chloride resin is produced by drying an aqueous dispersion containing fine particles only, as has been common in the conventional techniques, a plastisol obtainable from such a resin will have a high viscosity or will be poor in the stability of the viscosity as time passes.

Further, Japanese Examined Patent Publication No. 23180/1973 discloses a process for producing a granular vinyl chloride resin which comprises adding a certain amount of a liquid flocculating agent to a paste-making vinyl chloride resin in a fine powder form, then granulating the mixture by an extruder and drying the resulting granulated product by a fluidized bed dryer. The granular vinyl chloride resin produced by this process is made solely of fine vinyl chloride resin particles and dried at a high temperature at a level of 80° C. and, as such, can not be used for paste-making even if a plasticizer is mixed thereto, and a step of crushing it by a crusher will be required to obtain a plastisol. Even if a plastisol is obtained, its fluidity will not necessarily be satisfactory, and there will be a problem also with respect to the stability with time. Further, a resin granulated by means of an organic liquid or a flocculating agent, is known. However, there is a possible adverse effect of the organic liquid or the flocculating agent to various properties such as durability and printability of the resin itself.

A plastisol prepared from such a resin can hardly be useful for high-speed coating, rotary screen printing, spray coating or dipping, and it has been required to adjust the viscosity, the fluidity, etc. by mixing it with other resins.

SUMMARY OF THE INVENTION

The present inventors have conducted extensive studies with an aim to obtain a vinyl chloride resin which is low-dusting, excellent in the powder flowability, measurable by automatic weighing and more readily fusible than a vinyl chloride resin produced by suspension polymerization and which is capable of readily presenting a plastisol having a low viscosity and excellent fluidity even at a high shearing region, when dispersed in a plasticizer. As a result, it has been found possible to obtain a granular vinyl chloride resin capable of accomplishing the above objects, by spray drying a part of a polyvinyl chloride latex containing fine vinyl chloride resin particles of not larger than 3 μm produced by fine suspension polymerization, mixing the particles of a few tens μm obtained by drying and having the surfaces of the fine vinyl chloride resin particles fused to one another, to the initial polyvinyl chloride latex, as they are or after pulverizing them, and spray drying the latex again by a conventional method, or increasing the solid content, followed by extrusion granulation, and drying the granulated product at a low temperature. The present invention has been accomplished on the basis of this discovery.

Namely, it is an object of the present invention to provide a granular vinyl chloride resin which is low-dusting, excellent in the powder flowability, measurable by automatic weighing and more readily fusible than the vinyl chloride resin produced by suspension polymerization and which is capable of readily presenting a plastisol which has a low viscosity and excellent fluidity at a high shearing region when dispersed in a plasticizer, and a process for its production.

Thus, the present invention provides a granular vinyl chloride resin having a mixture comprising the following vinyl chloride resin particles (A), (B) and (C) as main components granulated to have a spherical shape with a diameter of from 50 to 300 μm or a cylindrical shape with a diameter of from 0.1 to 20 mm:

(A) from 90 to 10% by weight of fine particles with diameters within a range of not larger than 3 μm (hereinafter referred to as fine particles (A)), (B) from 10 to 90% by weight of particles with diameters within a range of from 5 to 65 μm (hereinafter referred to as particles (B)), and (C) from 0 to 10% by weight of particles with diameters other than those of particles (A) and (B).

Now, the present invention will be described in detail with reference to the preferred embodiments.

DESCRIPTION OF THE PREFERRED EMBODIMENTS

The fine particles (A) used as a component of the granular vinyl chloride resin of the present invention are particles with diameters of not larger than 3 μm, which are usually prepared by spray drying a polyvinyl chloride latex prepared by emulsion polymerization or fine suspension polymerization, finely pulverizing the resulting vinyl chloride resin by a pulverizer such as a micro atomizer and classifying the pulverized particles to remove coarse particles with diameters larger than 3 μm. Otherwise, the fine particles (A) may be fine vinyl chloride polymer particles with diameters not larger than 3 μm, usually from 0.1 to 2 μm, in a polyvinyl chloride latex produced by emulsion polymerization or fine suspension polymerization.

The emulsion polymerization is a method wherein vinyl chloride or a mixture of vinyl chloride with a copolymerizable comonomer such as vinyl acetate, an alkyl (meth-)acrylate, ethylene or propylene, is polymerized in the presence of a water-soluble polymerization catalyst and an emulsifier for polymerization such as sodium lauryl sulfate or sodium dodecylbenzene sulfonate. The fine suspension polymerization is a method wherein vinyl chloride or a mixture of vinyl chloride with a copolymerizable comonomer, is finely uniformly dispersed and stabilized together with an emulsifier or a suspending agent and a polymerization catalyst soluble in vinyl chloride, by a dispersing machine such as a homogenizer, and then polymerized.

A polyvinyl chloride latex produced by such a method is such that the majority of the vinyl chloride polymer contained therein is fine particles of not larger than 3 μm. However, coarse particles which can not be pulverized by stirring during the polymerization step, may sometimes be formed. Accordingly, in the present invention, it is advisable to use the fine particles after removing coarse particles with diameters of 500 μm or higher, preferably particles larger than 65 μm. With respect to this latex, it is preferred to increase the solid content in the latex before use, by removing water from the latex by such a method as ultrafiltration.

The particles (B) used as a component of the granular vinyl chloride resin of the present invention are required to have particle diameters within a range of from 5 to 65 μm. Such particles (B) may usually be a paste vinyl chloride resin powder prepared by spray-drying the above-mentioned polyvinyl chloride latex obtained by emulsion polymerization or fine suspension polymerization. By spray-drying a latex containing fine vinyl chloride polymer particles of not larger than 3 μm, particles of at least about 10 μm having the surfaces of fine particles fused to one another, will be formed, and it is possible to obtain spherical particles with various sizes by controlling various conditions such as the rotational speed, pressure and flow rate of the latex, given to the spraying system including e.g. the rotary disk, the pressure nozzle and a double fluid nozzle.

The drying temperature for spray-drying is preferably at least 50° C. as the temperature of the stream at the outlet of the spray drying apparatus, and the upper limit is usually about 80° C. By adjusting the drying temperature within a range of from 50° to 60° C., particularly at a level of 55° C., from 10 to 40% of the particles will be disintegrated into fine particles, when dispersed in a plasticizer. This drying temperature condition is important for the purpose of permitting at least 70% of particles (B) to remain to have particle diameters of from 5 to 65 μm when a plasticizer is mixed to the granular vinyl chloride resin to form a plastisol, and it is a desired drying condition also for the purpose of maintaining excellent fluidity at a high shearing region. The crushing strength of the particles (B) dried at this drying temperature is preferably at least 1 $g/mm^2$, more preferably at least 5 $g/mm^2$. If the crushing strength is lower than 1 $g/mm^2$, a plastisol formed by the resulting granular vinyl chloride resin tends to have high viscosity. For example, if drying is conducted at a temperature of not higher than 50° C., most of the particles will be disintegrated in a plasticizer to initial fine particles.

In the present invention, the vinyl chloride resin powder (B) preferably has the same chemical composition as the fine vinyl chloride polymer particles (A) contained in the latex. However, a vinyl chloride resin powder (B) having a chemical composition different from the fine powders (A), may be used as the case requires.

Further, vinyl chloride resin particles so-called an extender resin for paste or a blending resin, may be used as the particles (B). The extender resin for paste is prepared usually by polymerizing vinyl chloride or a mixture of vinyl chloride with a copolymerizable comonomer in the presence of an oil-soluble polymerization catalyst and an emulsifier or a suspending agent. The individual particles are single spherical particles as distinguished from those having a number of fine particles fused to one another. Such particles can be obtained usually with substantially uniform particle diameters within a range of from 5 to 100 μm. Particles with diameters of up to 65 μm, preferably particles with an average particle diameter within a range of from 20 to 40 μm, may be produced by such a polymerization operation. The crushing strength of such particles is usually at least 1,000 $g/mm^2$. When an extender resin for paste is employed, no disintegration of particles (B) will occur in the plastisol, and the plastisol will have a low viscosity, and the fluidity at the high shearing region will be stable.

When the granular vinyl chloride resin of the present invention is to be used for paste processing, the vinyl chloride resin powder (B) is preferably used after classification to remove coarse particles with particle sizes exceeding 150 μm. In order to secure excellent fluidity at a high shear rate region of the plastisol, it is advisable to use particles with an average particle diameter within a range of from 5 to 45 μm. Of course, if the particle size of the vinyl chloride resin powder (B) is large, it may be pulverized by a pulverizer, followed by classification to obtain a powder having a desired range of the particle size. In a case where the granular vinyl chloride resin is to be used for the production of an extremely thin film, for the production of a transparent film or for screen printing of fine lines, the powder (B) is preferably particles smaller than 5 μm.

The particles (C) used as a component of the granular vinyl chloride resin are ones having particle diameters different from those of the fine particles (A) and the particles (B). There may be a case where particles (C) with diameters other than those prescribed for the fine particles (A) and the particles (B) can not completely be removed during the process for producing the particles (A) and (B), and a certain amount of particles having diameters outside the ranges prescribed for the particles (A) and (B) will remain, or a case where particles having diameters outside such ranges will be formed anew during the process for producing the granular vinyl chloride resin. Such particles will be referred to as the particles (C).

Thus, the proportions of the respective particles in the granular vinyl chloride resin are required to be such that in the total vinyl chloride resin, the fine particles (A) are within a range of from 90 to 10% by weight, the particles (B) are within the range of from 10 to 90% by weight, and the particles (C) are within a range of from 0 to 10% by weight. Preferably, the fine particles (A) are within a range of from 78 to 22% by weight, particularly from 75 to 40% by weight, and the particles (B) are within a range of from 22 to 78% by weight, particularly from 25 to 60% by weight. It is preferred that when formed into a plastisol, the particles will present a clear double peak particle size distribution.

The granular vinyl chloride resin may contain other additives such as a heat resistant stabilizer, an antioxidant, an ultraviolet absorber, a filler, a coloring agent and a plasticizer, as the case requires. The granular vinyl chloride resin of the present invention can be prepared, for example, as follows.

The polyvinyl chloride latex and the above-mentioned paste vinyl chloride resin powder are uniformly mixed to increase the solid content of the latex to obtain a slurry or latex, followed by spray-drying, or to obtain a wet cake or a wet powder, which is then extruded and granulated, followed by drying. The solid content of the slurry or latex after incorporating the paste vinyl chloride resin powder is preferably within a range of from 50 to 75% by weight. Likewise, the solid content in the wet cake or the wet powder is preferably within a range of from 75 to 90% by weight, more preferably from 75 to 85% by weight. Depending upon the solid content in the latex after the emulsion polymerization or fine suspension polymerization, the amount of the powder (B) to be incorporated, is properly adjusted. As described above, the higher the solid content of the latex, the better. Accordingly, it is advisable to add the powder (B) after concentrating the latex to the solid content of at least 40% by weight by means of a method such as ultrafiltration. In this manner, it is possible to minimize the amount of the powder (B) to be added, and the energy for drying in the process for producing the powder (B) can be reduced, thus bringing about an economical advantage. The amount of the powder (B) to be added to the latex is preferably within a range of from 10 to 90% by weight, more preferably from 22 to 78% by weight, based on the granular vinyl chloride resin after drying, from the viewpoint of the fluidity of the plastisol.

Mixing of the latex with the powder (B) may be conducted by any method. However, it is preferred to gradually add the powder (B) under stirring with the latex, whereby the slurry or latex, or the wet cake or the wet powder will be uniform, and the solid content can easily be controlled.

As a spray system for spray-drying the slurry or latex having the concentration of the solid content increased, various systems such as a rotary disk, a pressure nozzle and a double fluid nozzle can be employed. Granular vinyl chloride resins of various particles sizes can be obtained by selecting the spray system and the spray conditions. The particle size of the granular resin is preferably within a range of from 50 to 300 μm from the viewpoint of the powder flowability, the strength of granules, the dispersibility in a plasticizer and the applicable field. Of course, it is advisable to use the granular resin obtained by spray-drying after classifying it into various particle sizes, as the case requires.

The temperature for spray-drying is preferably not higher than 55° C. at the outlet of the drying apparatus i.g. as the temperature of the outlet air. If the drying temperature is higher than 55° C., dispersibility to a plasticizer will be inferior when a plastisol is to be prepared.

There is no particular restriction as to the apparatus for extruding and granulating a wet cake or a wet powder after the concentration of the solid content has been increased. Various extruding machines such as a usual screw extruder, a plunger extruder, a gear pump extruder and a roller extruder, can be used. The resin temperature during the extrusion and granulation should not be higher than 50° C. If the resin temperature is higher than 50° C., the product tends to be hardly dispersed in the plasticizer, and there will be a problem in the preparation of a plastisol. The particle size of the extruded granular resin varies depending upon the diameter of the extrusion nozzle. However, it is usually within a range of from 0.1 to 20 mm, preferably from 0.1 to 5 mm, more preferably from 0.3 to 3 mm. Particularly preferred are cylindrical particles cut in a proper length in view of the below-mentioned drying step, the powder flowability, the strength of granules, the dispersibility in a plasticizer and the applicable field. The extruded and granulated resin is subjected to fluidized bed drying, plate drying, vacuum drying or a puddle drier operation to remove the moisture remaining in the resin. Like the extrusion temperature, the drying temperature should be not higher than 50° C.

The granular vinyl chloride resin of the present invention may also be prepared by blending the fine particles (A) and the particles (B) in the predetermined proportions, mixing uniformly thereto a wetting agent such as water, an alcohol, a plasticizer or a surfactant, as the case requires, to obtain a wet cake or a wet powder, and then extruding it in the same manner as described above to obtain the granular product.

The granular vinyl chloride resin thus prepared preferably has a crushing strength within a range of from 10 to 60 g/mm$^2$, more preferably from 20 to 50 g/mm$^2$. If the crushing strength is less than 10 g/mm$^2$, the granules are likely to be broken during the transfer or transportation, and dusting is likely to take place during packaging or unpackaging. On the other hand, if the crushing strength is more than 60 g/mm$^2$, although the powder flowability will be excellent, the granules will not be disintegrated even when mixed with a plasticizer for the preparation of a plastisol, whereby a plastisol will not be formed, or a plastisol formed will be poor in its quality.

In a case where the granular vinyl chloride resin of the present invention is used for paste processing, it is preferred that when 100 parts by weight of the granular vinyl chloride resin and 60 parts by weight of a plasticizer are mixed by a planetary mixer (N-50 Model) at #1 speed (61 rpm) for 5 minutes and at #2 speed (125 rpm) for 15 minutes to prepare a plastisol, no non-dispersed particles with diameters of at least 100 μm will remain in the resulting plastisol, and particles with diameters within a range of from 5 to 65 μm will remain in the plastisol in an amount of at least 70% by weight. When the crushing strength is within the above range, it is possible to obtain a satisfactory plastisol.

Now, the present invention will be described with reference to Examples. However, it should be understood that the present invention is by no means restricted to such specific Examples. The fine particles (A), the particles (B) and the granular resin were evaluated as follows.

1. Measurement of particle sizes (a) Particle size in a latex

Measured by centrifugal particle size meter (manufactured by TECHNIDYNE Company)

(b) Particle size of a dried product

Measured by a laser diffraction system particle size measuring apparatus (LA-500, manufactured by Horiba Seisakusho)

A flow cell holder was set to the apparatus, about 200 ml of a 0.1% polyoxyethylene sorbitane monolaurate aqueous solution was put as a dispersion medium into a bath and circulated under stirring. A diffraction image blank was measured, and then a small amount of a sample resin was added to the bath and dispersed for 30 seconds. Then, the particle distribution of the sample resin was measured, and the average particle size was calculated.

(c) Particle size of a granular resin

Same as the above (b), provided that a Tyler sieve was used when the particle size exceeded 200 μm.

(d) Particle size in a plastisol

A plastisol prepared as described hereinafter in 6 (a), was measured in the same manner as in the above (b). However, a mixture of kerosene and di-2-ethylhexylphthalate (1:1) was used as the dispersion medium, and a plastisol was added thereto.

Further, a Tylor sieve was used to ascertain the presence or absence of particles with diameters exceeding 200 μm.

2. Particle shape

Observed by a scanning electron microscope (SEM).

3. Crushing strength

Using a microcompression tester (MCTM-500, manufactured by Shimadzu Corporation), one agglomerated particle of a vinyl chloride resin was compressed by gradually exerting a load, whereby the load at which an abrupt change occurred, was determined. The abrupt change in the load represents crushing of the particle. The crushing strength was represented by the load per the cross-sectional area of the particle (g/mm$^2$) as an average of ten particles.

4. Powder flowability

The angle of repose was measured by a powder tester (manufactured by Hosokawa Funtai Kenkyusho)

5. Dusting 100 g of a granular resin was dropped all at once from the top of a measuring cylinder having a height of 1 m, and the dusting property was evaluated by the height of the dusting immediately after the dropping.

⊚: dusting 0 cm

○: dusting less than 50 cm

Δ: dusting from 50 to 100 cm

×: dusting more than 100 cm

6. Viscosity of a plastisol (a) Initial viscosity: The numerical value of a plastisol prepared by mixing a vinyl chloride resin/a plasticizer= 100/60 (parts by weight) by a planetary mixer (N-50) at #1 speed (61 rpm) for 5 minutes and #2 speed (125 rpm) for 15 minutes, as measured by a Brook field viscometer (B-Model viscometer) at 23° C. at 50 rpm.

(b) Viscosity upon expiration of 24 hours: The above sol was maintained at 23° C. for 24 hours, whereupon the viscosity was measured in the same manner as in (a).

(c) Viscosity under high shearing force: Using a Severs Model viscometer (S-Model viscometer), the discharged amount (unit: gram) of the above sol per 100 seconds under a pressure of 90 psi was measured.

EXAMPLES 1 TO 8

Process for producing vinyl chloride resin particles (B)

Particles (B)-1 to (B)-3

Preparation of a seed polymer latex

Into a polymerization reactor having a capacity of 200 l and equipped with a stirrer, 90 kg of deionized water at 54° C., 10 g of potassium persulfate and 50 g of sodium pyrosulfite were charged and dissolved under stirring for about 20 minutes. Then, the pressure in the polymerization reactor was reduced to −610 mmHg, and the system was maintained at 55° C. for 50 minutes.

Then, 60 kg of vinyl chloride was charged to the polymerization reactor, and the temperature in the reactor was adjusted to 50° C. Upon expiration of 15 minutes after charging vinyl chloride, a preliminarily dissolved 0.2% potassium persulfate aqueous solution was gradually added at a rate of about 10 ml/min. Thereafter, the reaction was conducted while controlling the addition rate of the potassium persulfate solution so as to maintain a constant polymerization speed. When the conversion reached about 15%, addition of a separately dissolved sodium lauryl sulfate aqueous solution was initiated, and the same aqueous solution was added at a rate of about 80 ml/10 min until the total amount of sodium lauryl sulfate added became 360 g. When the pressure in the reactor dropped by 2.0 kg/cm$^2$ from the saturated pressure of vinyl chloride at 50° C., the reaction was stopped, and unreacted vinyl chloride was recovered to obtain a latex containing seed polymer particles having an average particle size of 0.5 μm.

Preparation of polymer latex

Into a polymerization reactor having a capacity of 200 l and equipped with a stirrer, 80 kg of deionized water and the latex containing polymer particles having an average particle size of 0.5 μm prepared as described above in an amount of 4.5 kg as calculated as the solid content, as the polymer seeds, were charged. Then, the reactor was deaerated, and 25.5 kg of vinyl chloride was added. Then, the temperature was raised to 57° C., and a total of 0.05% (relative to vinyl chloride) of a redox-type polymerization initiator of hydrogen-peroxide-formaldehyde-sodium sulfoxylate was continuously added thereto so as to maintain a constant reaction rate.

Further, during the period from the time when the conversion reached 10% of the total amount of the polymer seeds and vinyl chloride to the completion of polymerization, a 8% sodium lauryl sulfate aqueous solution was continuously added as an emulsifier for polymerization, at a rate of 0.1% per hour as calculated as the pure substance relative to vinyl chloride. Further, from the time when the conversion reached 15%, a total amount of 70 kg of vinyl chloride was added at a rate of 12 kg/20 min. When the polymerization pressure dropped by 1 kg/cm$^2$ from the saturated pressure of vinyl chloride at 57° C., the addition of the initiator was stopped to terminate the polymerization, and unreacted vinyl chloride was recovered. The obtained latex contained polymer particles having an average particle size of 0.9 μm, and the concentration of the solid content was 39.6% by weight. This latex was concentrated by ultrafiltration to a concentration of the solid content of 43.6% by weight. This latex is designated as latex (A)-1.

This concentrated latex (A)-1 was spray-dried by means of a spray-drying apparatus, a rotary disk (outlet temperature: 55° C.) and a double fluid nozzle (outlet temperature: 60° C.) to obtain particles (B)-1 and particles (B)-2 having an average particle sizes of 60 μm and 30 μm, respectively. Further, the particles (B)-1 were pulverized by a microatomizer, and fine particles were removed as far as possible to obtain particles (B)-3 having an average particle size of 5 μm. The crushing strength and apparent densities of the respective particles (B)-1 to (B)-3 are shown in Table 1.

Particles (B)-4

Further, commercially available extender resin for paste having an average particle size of 35 μm was listed as particles (B)-4 also in Table 1.

TABLE 1

| Particles B | Average particle size (μm) | Shape | Crushing strength (g/mm²) | Apparent density |
|---|---|---|---|---|
| (B)-1 | 60 | Spherical | 10 | 0.45 |
| (B)-2 | 30 | Spherical | 90 | 0.40 |
| (B)-3 | 5 | Irregular | 10> | 0.27 |
| (B)-4 | 35 | Spherical | >1000 | 0.50 |

Process 1 for producing a granular resin

The concentrated latex having a solid content of 43.6% by weight and containing fine particles of 0.9 μm, produced in the preparation of the above-mentioned polymer latex (A)-1, was used by itself as fine particles (A). The fine particles (A) and the particles (B) were blended in the proportions as identified in Table 2, and the latex or a wet cake having the concentration of the solid content increased, was spray-dried (outlet temperature: 50° C.), extruded and granulated (a small diameter granulating machine, fine disk pelleter, manufactured by Fuji Powder), respectively. The extruded and granulated product was dried at a temperature of 45° C. in a stand still condition.

Various physical properties of the obtained granular resins are shown in Table 2.

TABLE 2

| Example | Process for producing a granular resin | Types B/A | Proportions (parts by weight) | Concentration of the dispersion or the wet cake (%) | Physical properties of the granular resin | | | | |
|---|---|---|---|---|---|---|---|---|---|
| | | | | | Particle diameter × length (μ) | Shape | Crushing strength (g/mm²) | Angle of repose (degree) | Dusting |
| 1 | Spray- | B-1/A-1 | 100/270 | 59 | 90 | Spherical | 20 | 40 | ○ |
| 2 | drying | B-2/A-1 | 100/140 | 67 | 130 | Spherical | 25 | 43 | ○ |
| 3 | | B-3/A-1 | 100/280 | 58 | 90 | Spherical | 20 | 41 | ○ |
| 4 | | B-4/A-1 | 100/200 | 62 | 115 | Spherical | 25 | 45 | ○ |
| | Extru- | | | | (mm) × (mm) | | | | |
| 5 | sion | B-1/A-1 | 100/35 | 85 | 0.8 × 2 | Cylindrical | 20 | 37 | ⊙ |
| 6 | and | B-2/A-1 | 100/55 | 80 | 0.8 × 2 | Cylindrical | 20 | 36 | ⊙ |
| 7 | granu- | B-3/A-1 | 100/45 | 82 | 0.8 × 2 | Cylindrical | 20 | 39 | ⊙ |
| 8 | lation | B-4/A-1 | 100/65 | 78 | 0.8 × 2 | Cylindrical | 20 | 35 | ⊙ |

The viscosities of the plastisols of the obtained granular vinyl chloride resins were measured and shown in Table 3.

TABLE 3

| Example | Viscosity | | | Particle sizes in the plastisol (wt %) | |
|---|---|---|---|---|---|
| | Initial (cps) | Upon expiration of 24 hrs (cps) | Under high shearing force (g/100 sec) | >100 μm | 5–65 μm |
| 1 | 4,200 | 4,500 | 600 | 0 | 43 |
| 2 | 4,000 | 4,200 | 1,100 | 0 | 71 |
| 3 | 4,200 | 4,500 | 600 | 0 | 30 |
| 4 | 3,900 | 4,200 | 1,000 | 0 | 75 |
| 5 | 4,200 | 4,500 | 600 | 0 | 42 |
| 6 | 4,000 | 4,200 | 1,100 | 0 | 73 |
| 7 | 4,200 | 4,500 | 600 | 0 | 30 |
| 8 | 3,900 | 4,200 | 1,100 | 0 | 75 |

EXAMPLES 9 TO 12 AND COMPARATIVE EXAMPLES 1 TO 3

Preparation of polyvinyl chloride latex

Latex (A)-2

Into a prepolymerization reactor having a capacity of 200 l and equipped with a stirrer, 100 kg of deionized water, 600 g of lauroyl peroxide, 400 g of sodium lauryl sulfate and 200 g of lauryl alcohol were charged. Then, the interior of the prepolymerization reactor was deaerated, and 60 kg of a vinyl chloride monomer was charged. The temperature was maintained at 35° C. under stirring. Then, after stirring uniformly, the mixture was dispersed to a desired liquid droplet size (about 0.5 to 0.7 μm) by means of a dispersing machine (homogenizer), and the dispersion was transferred to a polymerization reactor having a capacity of 200 l, equipped with a stirrer and preliminarily deaerated. After completion of the transfer of the dispersion, the temperature of the polymerization reaction solution was raised to 50° C. whereby fine suspension polymerization was conducted in a conventional method to obtain a latex having vinyl chloride seed polymer particles having an average particles size of 0.6 μm.

Using this latex containing seed polymer particles, polyvinyl chloride latex (A)-2 was prepared as follows.

Namely, into a polymerization reactor having a capacity of 200 l and equipped with a stirrer, 80 kg of deionized water, 5 kg (as calculated as the solid content in the latex) of the above-mentioned seed polymer particles and 20 g of sodium hydrogen carbonate were charged. After deaeration, 75 kg of a vinyl chloride monomer was charged, and the temperature was raised to 55° C. Then, a 0.3% aqueous solution of sodium hydrogen sulfite preliminarily dissolved, was added gradually (about 1,500 ml/hr) continuously over a period of 40 minutes to the polymerization reactor to conduct the polymerization. After the initiation of the addition of sodium hydrogen sulfite, the speed of addition was controlled so that the reaction was conducted at a constant reaction rate.

Further, during the period from the time when the conversion reached 10% to the completion of polymerization, an about 8% aqueous solution of sodium lauryl sulfate was continuously added as an emulsifier at a rate of 0.1% per hour to the vinyl chloride monomer. The total amount of the emulsifier added, was 0.6% to the vinyl chloride monomer.

When the pressure for polymerization dropped by 1 kg/cm$^2$ from the saturation pressure of vinyl chloride at 55° C., sodium sulfite was added to terminate the polymerization, and an unreacted monomer was recovered. To remove coarse particles formed in the polymer, the polymer was passed through a 100 mesh screen, but there was no coarse particle.

The average particle size of the polymer particles in the obtained latex was 1.1 μm, and the concentration of the solid content in the latex was 41.0% by weight. This latex was subjected to ultrafiltration to adjust the concentration of the solid content to 45% by weight.

Process 2 for producing granular resin

The above-mentioned latex (A)-2 and the resin powder (B) as used in Examples 1 to 4, were mixed in the proportions as identified in Table 4 to obtain a highly concentrated latex, which is then spray-dried by means of a rotary disk at a discharge air temperature of 50° C. to obtain various granular resins. The mixing of the latex (A)-2 and the powder (B) was conducted by adding and dispersing the powder continuously under stirring the latex. The physical properties of the granular resins are shown in Table 4.

TABLE 5

| | Plastisol | | |
|---|---|---|---|
| | Initial (cps) | Upon expiration of 24 hrs (cps) | Under high shearing force (g/100 sec) |
| Example 9 | 3,900 | 4,100 | 700 |
| Example 10 | 3,700 | 3,900 | 1,200 |
| Example 11 | 3,900 | 4,200 | 680 |
| Example 12 | 3,500 | 3,600 | 1,050 |
| Comparative Example 1 | 5,200 | 6,000 | 500 |
| Comparative Example 2 | 5,800 | 6,300 | 800 |
| Comparative Example 3 | 5,300 | 5,900 | 450 |

EXAMPLES 13 TO 16

Process 3 for producing granular resins

The above-mentioned latex (A)-2 and the resin powder (B) were mixed in the proportions as identified in Table 6 to obtain a wet cake, which was then extruded without heating by means of a single screw extruder equipped with a multi-perforated screen with a pore diameter of 0.8 mm and cut in a length of from 1 to 2 mm, followed by drying at a temperature of 45° C. by a fluidized bed drier to obtain a granular resin. The mixing of the latex (A)-2 and the powder (B) was conducted by continuously adding and mixing the powder under stirring the latex. The physical properties of the granular resins and plastisols are shown in Table 6.

TABLE 4

| | Latex and powder | | | Granular resin | | | | |
|---|---|---|---|---|---|---|---|---|
| | Types A/B | Proportions (parts by weight) | Concentration of solid content (%) | Particle size (μm) | Shape | Crushing strength (g/mm$^2$) | Angle of repose (degree) | Dusting |
| Example 9 | A-2/B-1 | 100/35 | 59 | 8 | Spherical | 20 | 40 | o |
| Example 10 | A-2/B-2 | 100/70 | 68 | 120 | Spherical | 25 | 39 | o |
| Example 11 | A-2/B-3 | 100/35 | 59 | 85 | Spherical | 20 | 42 | o |
| Example 12 | A-2/B-4 | 100/45 | 62 | 103 | Spherical | 25 | 43 | o |
| Comparative Example 1 | B-1 | 100 | — | 60 | Spherical | 10 | 49 | Δ |
| Comparative Example 2 | B-2 | 100 | — | 30 | Spherical | 90 | >50 | x |
| Comparative Example 3 | B-3 | 100 | — | 5 | Irregular | 10> | >50 | Δ |

From the obtained granular resins, plastisols were prepared and their viscosities were measured and shown in Table 5.

TABLE 6

| | Latex and powder | | | | | | Plastisol | | |
| --- | --- | --- | --- | --- | --- | --- | --- | --- | --- |
| | | Proportions (parts by weight) | Concentration of the dispersion of the wet cake (%) | Granular resin | | | | Viscosity | |
| | Types A/B | | | Crushing strength (g/mm²) | Angle of repose (degree) | Dusting | Initial (cps) | Upon expiration of 24 hrs (cps) | Under high shearing force (g/100 sec) |
| Example 13 | A-2/B-1 | 100/270 | 85 | 20 | 37 | ⊙ | 3,900 | 4,100 | 700 |
| Example 14 | A-2/B-2 | 100/180 | 80 | 20 | 36 | ⊙ | 3,700 | 3,900 | 1,200 |
| Example 15 | A-2/B-3 | 100/210 | 82 | 20 | 39 | ⊙ | 3,900 | 4,200 | 680 |
| Example 16 | A-2/B-4 | 100/140 | 77 | 20 | 35 | ⊙ | 3,500 | 3,600 | 1,050 |

According to the present invention, it is possible to produce a granular resin of a spherical or cylindrical shape having a large particle size of at least 50 μm from a latex containing fine vinyl chloride resin particles obtained by emulsion polymerization or fine suspension polymerization, and the obtained granular resin is low-dusting and excellent in the powder flowability, whereby automatic weighing will be possible, and packaging and transportation will be facilitated, and its handling efficiency will be improved. The granular resin is excellent in the heat melting property and suitable as a resin material for extrusion molding, injection molding, calendar processing, rotary molding, an Engel process, a Heisler process or a Hayashi process, in spite of the large particle size equal to or larger than the vinyl chloride resins produced by suspension polymerization.

Further, the granular resin of the present invention is composed of at least two resin particles having different particle sizes i.e. fine particles and larger particles, which are granulated with their surfaces bonded by a mild force of fusion, whereby penetration of a plasticizer is quick as compared with a granular resin composed solely of a single type of fine particles, and when stirred in a plasticizer, the granules will readily be disintegrated to form a low viscosity paste sol, which has excellent stability of viscosity and excellent fluidity at a high shearing region, and it is unnecessary to mix other extender resin.

The granular resin of the present invention may be subjected to various molding methods such as extrusion molding, injection molding, calendar processing, powder molding, etc. as a resin excellent in the heat fusion properties and as a substitute for a vinyl chloride resin produced by suspension polymerization. Further, the granular resin of the present invention is useful as a paste-making resin and may be used for high speed coating, rotary screen printing, spray coating or dip coating.

What is claimed is:

1. A paste-making, spherical, low dusting and powder flowable granular vinyl chloride resin having a crushing strength of 10 to 60 g/mm² with a diameter of from 50 to 300 μm prepared by spray-drying a latex or a slurry obtained by mixing:

(A) from 90 to 10% by weight on a solid particle basis of a polyvinyl chloride latex produced by emulsion polymerization or fine suspension polymerization containing fine particles with diameters within a range of not larger than 3 μm, (B) from 10 to 90% by weight of large particles with diameters within a range of from 5 to 65 μm prepared by spray-drying a polyvinyl chloride latex obtained by emulsion polymerization or fine suspension polymerization by using a double fluid nozzle, and (C) from 0 to 10% by weight of particles with diameters other than those of particles (A) and (B), said fine particles and large particles being granulated and bonded on their surfaces.

2. The granular vinyl chloride resin according to claim 1, which has a crushing strength of from 10 to 60 g/mm².

3. The granular vinyl chloride resin according to claim 1 or 2, whereby when 100 parts by weight of the granular vinyl chloride resin and 60 parts by weight of a plasticizer are mixed by a planetary mixer (N-50 Model) at #1 speed (61 rpm) for 5 minutes and at #2 speed (125 rpm) for 15 minutes to prepare a plastisol, no non-dispersed particles with diameters of at least 100 μm will remain in the resulting plastisol.

4. The granular vinyl chloride resin according to claim 3, whereby at least 70% by weight of the particles (B) will remain to have diameters within a range of from 5 to 65 μm in the plastisol.

5. The granular vinyl chloride resin according to claim 1, wherein the particles (B) have the same chemical composition as the fine particles (A).

* * * * *